US007330621B2

(12) United States Patent
Elkins, II et al.

(10) Patent No.: US 7,330,621 B2
(45) Date of Patent: Feb. 12, 2008

(54) FLEXIBLE OPTICAL CLOSURE AND OTHER FLEXIBLE OPTICAL ASSEMBLIES

(75) Inventors: Robert B. Elkins, II, Hickory, NC (US); Lars K. Nielsen, Denver, NC (US); James P. Luther, Hickory, NC (US); Thomas Theuerkorn, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 40 days.

(21) Appl. No.: 11/268,345

(22) Filed: Nov. 7, 2005

(65) Prior Publication Data

US 2006/0056782 A1 Mar. 16, 2006

Related U.S. Application Data

(63) Continuation-in-part of application No. 10/852,427, filed on May 24, 2004, now Pat. No. 7,127,143, and a continuation-in-part of application No. 10/999,691, filed on Nov. 30, 2004, now Pat. No. 7,228,036, and a continuation-in-part of application No. 11/025,507, filed on Dec. 29, 2004, now Pat. No. 7,155,093.

(51) Int. Cl.
*G02B 6/44* (2006.01)
*G02B 6/00* (2006.01)
(52) U.S. Cl. ............... 385/100; 385/102; 385/103; 385/109; 385/113; 385/134; 385/135
(58) Field of Classification Search ........ 385/100
See application file for complete search history.

(56) References Cited

U.S. PATENT DOCUMENTS

| 4,469,401 | A | * | 9/1984 | Yamazaki et al. | 385/102 |
| 5,343,549 | A | * | 8/1994 | Nave et al. | 385/103 |
| 5,440,665 | A | * | 8/1995 | Ray et al. | 385/135 |
| 5,997,186 | A | * | 12/1999 | Huynh et al. | 385/99 |
| 7,127,143 | B2 | * | 10/2006 | Elkins et al. | 385/100 |
| 7,155,093 | B2 | * | 12/2006 | Elkins et al. | 385/100 |
| 2003/0210875 | A1 | * | 11/2003 | Wagner et al. | 385/100 |
| 2005/0129375 | A1 | * | 6/2005 | Elkins et al. | 385/100 |

OTHER PUBLICATIONS

Corning Cable Systems Product Sheet SRP-005-026, Installation of Corning Cable Systems Self-supporting (Figure-8) Aerial Cable, Issue 7, Apr. 2004, 17 pages.

* cited by examiner

*Primary Examiner*—Frank G. Font
*Assistant Examiner*—Ryan Lepisto (57) ABSTRACT

Flexible closures and other flexible optical assemblies that are installed within a factory, or in the field, and then deployed using cable installation methods, wherein the flexible closures and assemblies have the ability to bend and twist without incurring physical damage to their structure, optical fibers and splices disposed within, and without significant attenuation in the optical fibers when exposed to conventional installation stresses. Flexible closures that replace conventional substantially rigid closures in order to facilitate pre-engineered and assembled distribution cable installation within an optical network, and the physical, bending and material properties of such closures, and methods of manufacturing and installing the same.

20 Claims, 9 Drawing Sheets

FLEXIBLE OPTICAL CLOSURE AND OTHER FLEXIBLE OPTICAL ASSEMBLIES

CROSS-REFERENCE TO RELATED APPLICATIONS

This application is a continuation-in-part of the following United States Applications: application Ser. No. 10/852,427, filed on May 24, 2004 now U.S. Pat. No. 7,127,143 and entitled "DISTRIBUTION CABLE ASSEMBLY HAVING OVERMOLDED MID-SPAN ACCESS LOCATION"; application Ser. No. 10/999,691, filed on Nov. 30, 2004 now U.S. Pat. No. 7,228,036 and entitled "ADJUSTABLE TETHER ASSEMBLY FOR FIBER OPTIC DISTRIBUTION CABLE," and; application Ser. No. 11/025,507, filed on Dec. 29, 2004 now U.S. Pat. No. 7,155,093 and entitled "DISTRIBUTION CABLE HAVING OVERMOLDED MID-SPAN ACCESS LOCATION WITH PREFERENTIAL BENDING," the contents of which are hereby incorporated by reference.

BACKGROUND OF THE INVENTION

1. Field of the Invention

The present invention relates generally to flexible solutions for protecting and sealing cable access locations, cable assemblies and optical interconnection points, and more specifically, it relates to flexible optical closures and optical connection terminals, and the performance and material properties of such closures and terminals.

2. Technical Background

Optical fiber is increasingly being used for a variety of broadband communications including voice, video and data transmissions. As a result of the increasing demand for broadband communications, fiber optic networks typically include a large number of mid-span access locations, also referred to herein as "network distribution points" or "termination points," at which one or more optical fibers are terminated from a distribution cable and spliced to other optical fibers of tether cables or fiber optic drop cables. These mid-span access locations provide a distribution point from the distribution cable leading to another distribution point, or a drop point from the distribution cable leading to an end user, commonly referred to as a subscriber, thereby extending an "all optical" communications network closer to the subscriber. In this regard, fiber optic networks are being developed that deliver "fiber-to-the-curb" (FTTC), "fiber-to-the-business" (FTTB), "fiber-to-the-home" (FTTH), or "fiber-to-the-premises" (FTTP), referred to generically as "FTTx." Based on the large number of mid-span access locations and the unique demands of terminated optical fibers at these mid-span access locations, protective enclosures are needed for maintaining and protecting the optical fibers, splice points and accessed portions of fiber optic cables at these numerous mid-span access locations positioned along the length of the distribution cable. Protective enclosures are also needed to maintain and protect, and in some embodiments seal, optical connectors and optical fibers of optical connection terminals spliced or otherwise interconnected with the mid-span access locations and positioned within the FTTx network.

Creating mid-span access locations and splicing tether or drop cables to them in the factory prior to distribution cable installation has been developed in order to eliminate the substantial expertise and experience required to access a distribution cable and configure optical connections in the field. In particular, it is not only difficult to access a distribution cable at a predetermined position once the cable is installed, but it is also difficult to access and identify a particular optical fiber of the distribution cable to be optically connected with an optical fiber of the tether or drop cable. Once identified, the optical fiber of the distribution cable is typically joined directly to the optical fiber of the tether or drop cable at the mid-span access location using conventional splicing techniques, such as fusion splicing. In other instances, the optical fiber of the distribution cable and the optical fiber of the drop cable are first spliced to a short length of optical fiber having an optical connector mounted on the other end, which is generally referred to in the art as a "pigtail." The pigtails are then routed to opposite sides of an alignment member to properly interconnect the tether or drop cable with the distribution cable. In either case, the process of creating the mid-span access location and splicing the pre-selected optical fibers is not only time consuming, but must be accomplished by a highly-skilled field technician at significant cost and under field working conditions that are less than ideal.

Accordingly, the processes of creating access locations, terminating optical fibers and splicing the optical fibers to tether or drop cables was moved from the field to the factory with the introduction of pre-engineered solutions in which distribution cable assemblies including mid-span access locations are built in the factory for successful deployment and field installation. In addition to the problem of manufacturing these pre-engineered cable assemblies with their mid-span access locations in the proper positions, there are also problems encountered with using conventional components to protect the access locations and optically connect the optical fibers of the distribution cable with optical fibers of tether or drop cables at the mid-span access locations. For example, rigid enclosures are typically used to protect the section of the distribution cable that must be exposed to access the appropriate optical fibers and the splices. Distribution cables provided with conventional enclosures tend to be large in size and inflexible, and thus, unable to satisfy common deployment constraints, such as being wound onto a reel, deployed through conduits having a relatively small inner diameter or significant bends, or deployed through conventional aerial lashing equipment, such as sheaves and rollers. Furthermore, such enclosures are often structurally complex and difficult to install.

Thus, along with the development of pre-engineered cable assemblies, a need has arisen for a solution to replace the use of conventional rigid enclosures that are incapable of being installed within a factory and then deployed using typical cable installation methods (e.g., drive-off) without incurring any damage to the enclosure or optical fibers within. An enclosure solution for a pre-engineered cable assembly should not only meet or exceed the protection and sealing performance characteristics of conventional rigid enclosures, but should also allow the distribution cable to be installed using typical cable installation methods without damage to the enclosure, without compromising the sealing integrity of the enclosure and without exposing the optical fibers or splices to physical damage or significant attenuation caused by installation stress as defined by industry standards. In addition, it would be desirable to use those same material and physical properties of a flexible optical splice enclosure and apply them to other components of the pre-engineered cable assembly to aid in installation, such as optical connection terminals interconnected with the distribution cable at an access location and added in the factory. The flexible enclosures and other components would provide the pre-engineered cable assembly with a small enough diameter and the flexibility to be wound onto a reel, deployed through a conduit having a relatively small inner diameter or significant bends, or deployed using conventional aerial lashing equipment.

SUMMARY OF THE INVENTION

In one aspect, the present invention provides various embodiments of flexible optical assemblies that are suitable for use in the production of factory or field-built fiber optic cable assemblies capable of being installed using conventional cable installation methods.

In another aspect, the present invention provides a flexible optical closure that includes at least one overmolded portion associated with an optical access location of a pre-engineered cable assembly. The access location, for example, provides access to one or more terminated optical fibers of a distribution cable. In preferred embodiments, the flexible optical closure, and optical fibers therein, are capable of bending to about the minimum bend radius of the fiber optic cable upon which the flexible closure is installed. The flexible closure can be bent with a force about equal to the force required to bend the cable itself without the flexible closure attached to the cable. The bending range of the flexible closure is from about 0 degrees to about 360 degrees, allowing the flexible closure to be bent about a radius, twisted, and bent in S-shaped or U-shaped arcs. The flexible closure can be bent and/or twisted in virtually any direction. In preferred embodiments, the flexible closure has a preferential bend, yet it is flexible and twistable. The flexible closure preferably has an outer diameter sufficiently small enough to allow the pre-engineered cable assembly to be installed in buried and aerial networks through conduits or over aerial installation sheave wheels, pulleys and other installation equipment or hardware. Further, the flexible closure has a diametral ratio (ratio of the at least one overmold portion outer diameter to the cable outer diameter) from about 1.0 to about 5.0, preferably about 2.0. In preferred embodiments, the closure has an aspect ratio (ratio of the length of the flexible closure to the outer diameter of the flexible closure) from about 10 to about 30, more preferably about 24. Intrinsic material properties of the at least one molded portion itself contribute to the flexible, yet sturdy, characteristic of the flexible optical closure. The molded portion of the flexible closure is formed, for example, by pouring a curable fluid material about optical components in a mold, and curing the material, so that the cured material defines a flexible yet durable closure about the components. In alternative embodiments, the flexible closure can include various optical network components, taken alone or in combination, for example: one or more optical fibers, splices, splice holders, optical connectors, jumpers, fanouts, buffer or fanout tubes, strength members, splitters, active optical components such as switches, lasers, and routers, wireless components, antennae, electrical/copper connector cables and power devices or any other desired optical and electrical hardware or cable components. In one preferred embodiment, the present invention can be in the form of a flexible splice closure having at least one molded portion associated with the splice.

In yet another aspect, the at least one molded portion may take the form of an overmolded body protecting and sealing cable access points, optical splice points and optical interconnection points within a fiber optic communications network. In preferred embodiments, the overmolded body is capable of bending to about the minimum bend radius of the fiber optic cable, and the optical fibers therein, upon which the overmolded portions are installed. In various embodiments, the overmolded body can have a bending force ratio from about 1.0 to about 10.0, more preferably from about 1.0 to about 5.0. The bending force ratio is defined as the ratio of a first force to a second force: first, the force required to bend an overmolded body (with optical components therein) about 90 degrees around a pre-selected minimum bend radius of the fiber optic cable, as for example, defined by a mandrel; and second, the force required to bend the same fiber optic cable about 90 degrees about the pre-selected minimum bend radius of that same cable without the closure attached to the cable. In preferred embodiments of the present invention which facilitate installation of the flexible closure, the overmolded body or bodies have a bending force ratio of about 1.0, implying that the force required to bend the overmolded body is about equivalent to the force required to bend that same fiber optic cable without the overmolded body. In various embodiments, the overmolded bodies have an outer diameter of about 1 to about 5 inches, where functional outer diameters range to about 4 inches for aerial applications where less than 3 inches is preferred, and range to about 4 inches for buried applications where less than 2 inches is preferred. Diametral ratios of about 3.0 or less are preferred, while ratios of about 2.0 or less are more preferred. Aspect ratios ranging from about 10 to about 30 are preferred. An intrinsic property of the material comprising the overmolded bodies preferably provides a modulus of elasticity of up to about 3.0 GPa, with a preferred range of about 0.001 to about 0.1 GPa, and an even more preferred modulus of elasticity of about 0.044 GPa. The overmolded bodies preferably have a Poisson's ratio from about 0 to about 0.5, more preferably about 0.2 to about 0.5, even more preferably from about 0.30 to about 0.5.

In yet another aspect, the present invention provides various embodiments of a pre-engineered fiber optic distribution cable assembly having predetermined mid-span access locations that serve as "tether attach points," and respective tethers for providing access to at least one terminated optical fiber of the distribution cable. The distribution cable assembly can be manufactured in the factory (i.e., factory-prepared) for a pre-engineered fiber optic communications network and is wound onto a cable reel or otherwise packaged for deployment in the field. The tether provides a short length of cable slack at each mid-span access location to allow a distribution or termination point to be positioned at a desired location, thereby eliminating the need for absolute accuracy in the engineering of the fiber optic network, the manufacture of the distribution cable assembly, and the deployment of the distribution cable assembly. Once the terminated optical fibers at each mid-span access location are optically connected to optical fibers of the tether cable, the mid-span access locations may be protected, and in some embodiments also sealed, using suitable molding techniques capable of producing a flexible closure around all or a portion of the mid-span access locations, and in some embodiments, also around a portion of the tether. The material properties of the molded portion associated with an optical connection allows the closure to be sufficiently flexible so as to permit the factory-manufactured cable assembly to be installed using conventional cable installation methods. The flexible closure is also preferably capable of bending to about the minimum bend radius of the fiber optic cable upon which it is installed, it can preferably be bent with a force about equal to the force required to bend the cable itself, and it preferably has an outer diameter small enough to permit installation in buried and aerial networks.

In yet another aspect, the present invention provides a fiber optic distribution cable assembly, which can be factory prepared, comprising at least one mid-span access location, one or more optical fibers accessed and terminated at the access location, a flexible overmolded body encapsulating all or a portion of the access location, at least one tether attached at the mid-span access location and one or more optical fibers of the tether optically connected to the one or more terminated optical fibers at their upstream ends. The downstream ends of the optical fibers of the tether are available for interconnecting with an optical connection terminal, one or more drop cables or it may terminate in any other suitable component, for example, optical connectors. The optical fibers of the tether are responsible for interconnecting drop cables with the terminated optical fibers of the distribution cable. In addition to the mid-span access locations, a flexible optical connection terminal positioned about the end of the tether may be formed from any suitable molding process capable of forming a molded portion being an overmolded body or bodies around the tether optical fibers terminating in optical connectors. The overmolded optical connection terminal may include any number of optical connectors arranged in any manner. In preferred embodiments, the protection and sealing performance of the overmolded optical connection terminal equals or exceeds the performance of conventional, substantially inflexible connection terminals. The material properties of the overmold material allow the connection terminal to be sufficiently flexible and small so as to permit the factory-manufactured cable assembly to be installed using conventional cable installation methods.

In yet another aspect, the present invention provides a flexible optical closure that includes one or more flexible components substantially surrounding an optical access location, wherein the access location, for example, provides access to one or more terminated optical fibers of a fiber optic cable. The flexible components are capable of bending to about the minimum bend radius of the fiber optic cable, and optical fibers therein, upon which the flexible components are installed. The flexible components can be bent with a force about equal to the force required to bend the cable itself without the flexible components attached. The flexible components can also be twisted, thus providing bending and twisting in virtually any direction. The flexible components have an outer diameter sufficiently small enough to allow installation in buried and aerial networks through any conventional conduit or over aerial installation sheave wheels and pulleys. Further, the flexible components have a diametral ratio (ratio of the component outer diameter to the cable outer diameter) from about 1.0 to about 5.0, preferably about 2.0. In preferred embodiments, the components have an aspect ratio (ratio of the length of the flexible components to the outer diameter of the flexible components) from about 10 to about 30, more preferably about 24. Intrinsic material properties of the one or more components contribute to their flexible yet sturdy characteristic, and in some embodiments, the geometric shape of the components and the positioning of strength components within also contribute to stiffness and can provide a preferential bend in the components.

In yet another aspect of the invention, a method is provided of forming a flexible closure molded portion, comprising the steps of: (i) arranging at least one optical component in a cavity; (ii) introducing a curable material in fluid form into the cavity, the fluid essentially flooding the cavity, penetrating interstices around and about the at least one optical component, and essentially covering the at least one optical component; and (iii) curing the curable material within suitable curing conditions. In another aspect of the invention a method is provided of installing a flexible closure assembly comprising at least one molded portion, comprising the steps of: (i) making the flexible closure as a securely assembled attachment to at least one cable and defining a flexible closure assembly; (ii) packaging the flexible closure assembly on a packaging device and causing the flexible closure assembly to flex; and (iii) paying off the flexible closure assembly from the packaging device.

Additional features and advantages of the invention are set out in the detailed description which follows, and will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the present invention, and provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof. Additionally, the drawings and descriptions are meant to be illustrative and not limiting.

DETAILED DESCRIPTION OF THE PREFERRED EMBODIMENTS

Reference will now be made in detail to the present preferred embodiments of the invention, and examples of which are illustrated in the accompanying drawings. Whenever possible, the same reference numerals will be used throughout the drawings to refer to the same or like parts.

Throughout the figures and various embodiments, the present invention provides a flexible optical closure having optical components therein. The flexible closure preferably has at least one molded portion that can be in the form of an overmolded portion. Flexible closures of the present invention are combined with optical cables to define flexible assemblies that are durable yet sufficiently flexible so as to permit installation using installation methods and equipment. In contrast to rigid closures that are not able to be bent around sheave wheels, installation pulleys and conduits, the flexible closures of the present invention are bendable and twistable and may be installed around installation pulleys and within conduits while maintaining structural integrity sealing, and optical and mechanical performance. In preferred embodiments, the flexible assemblies are installed in the factory during the production of cable assemblies in order to produce factory-built, pre-engineered cable assemblies. Factory prepared assemblies can eliminate or reduce the need for first deploying a fiber optic distribution cable and then performing a mid-span access in the field. In alternative embodiments, the flexible assemblies of the present invention may be applied to cables and other optical network components after cable and component installation in order to provide superior sealing and protection as compared to conventional rigid, substantially inflexible closures and enclosures made, for example, of hardened plastic or metal.

In the various embodiments described including a fiber optic distribution cable, the distribution cable comprises at least one access location positioned along the length of the distribution cable, referred to herein as a "mid-span access location," for providing access to at least one optical fiber terminated from the distribution cable, also referred to herein as at least one "preterminated" optical fiber. In preferred embodiments, the distribution cable assembly comprises a plurality of predetermined mid-span access locations at spaced apart locations along the length of the distribution cable, thus providing multiple access locations, or tether attach points (also referred to herein as "tap points") for attaching a tether cable to the distribution cable. The mid-span access locations are covered with flexible closures to provide protection, flexibility and sealing. The fiber optic distribution cable assembly including the flexible closures and tethers may be wound onto a reel or otherwise packed for shipping and deployment through a conduit or duct having relatively small inner diameters or significant bends, or through conventional aerial lashing equipment, such as sheaves or rollers. The distribution cable assembly of the present invention provides communications service providers with a factory-prepared, low-profile fiber optic distribution cable having mid-span access locations that are protected during cable shipping, deployment and network installation. By eliminating the rigid structure of a conventional enclosure, the mid-span access location length may be increased, preferably up to about 4 feet, and more preferably up to about 3 feet, while maintaining sufficient flexibility to be deployed through conduits having a relatively small diameter or significant bends or through aerial conventional lashing equipment. The concepts of the present invention can be applied to manufacturing techniques outside a factory environment as well.

The terms "molded portion," "overmolded" and "overmolding" are used throughout the specification and are intended to describe any now known or hereafter devised flexible, molded portion associated with an optical access location, for example, a mid-span access location. An exemplary molding or overmolding process for use with the present inventions is one in which: (i) arranging at least one optical component in, for example, a cavity made by a molding tool, die or die-casting; (ii) introducing a curable material in fluid form into the cavity, the fluid essentially flooding the cavity, penetrating interstices around and about the at least one optical component, and essentially covering the optical components; and (iii) curing the curable material within suitable curing conditions. Exemplary processes for use in forming the at least one molded portion of the flexible closure of the present invention include, but are not limited to, pour and injection molding, pressure molding, and die casting. Alternative exemplary processes for use in forming the at least one molded portion of the flexible closure of the present invention include vacuum and heat forming processes. Also, the overmolded portion can be applied by extruding a flexible closure material while pulling the assembly through a die. Most preferably, the at least one molded portion does not have a seam whereby water could penetrate, but is preferably an essentially monolithic form. While it is preferred that the mold material contacts the optical component, however, a flexible cover material, for example a paper, plastic, tubing, or tape material, may cover at least a portion of the at least one optical component prior to applying the molding material so that the curable material will not contact the component in the covered area. Exemplary materials suitable for the present invention include, but are not limited to, polyurethanes, silicones, thermoplastics, thermosets, elastomers, UV curable materials and like materials taken alone or in combination. The materials can include suitable additives, for example, plasticizers, flame retardant additives, and dyes or colorants. In preferred embodiments, the material forms an overmolded body being a durable and flexible covering over the optical interconnection or component(s), maintains sealing integrity between the underlying components and the external environment, and is capable of withstanding crush forces up to at least about 600 lbs or more. The molding process can be used to create a protective body that surrounds and seals all or a portion of a predetermined area, such as a mid-span access location. The portion of the area covered, and the sealing performance, may be increased or relaxed as desired based upon specific applications. The overmolded portion may also include one or more pre-molded pieces that are added to the cable or the at least one molded portion and fused or otherwise attached together to form a monolithic body, which can result in a virtual seam between the pieces. Curable means thermoplastic hardening, chemical additive curing, catalyst curing including energy curing as by heat or light energy, and phase changes.

Referring to FIGS. 1 and 2A-C, a pre-engineered distribution cable assembly 20 is shown including a flexible closure 22 having a molded or overmolded portion around a mid-span access location 24, wherein the mid-span access location 24 provides access to one or more terminated optical fibers 26 of a distribution cable 28. In preferred embodiments, the flexible closure 22 is capable of bending about an angle α (FIG. 2B) and-or twisting about an angle β (FIG. 2C) in essentially any direction and about various bending radii, for example in single arcs or combination arcs defining S-shapes or U-shapes or other bent shapes, but it is most preferred to bend the closure about an engineered neutral axis and a minimum bend radius of the distribution cable 28 upon which it is installed. The minimum bend radius can be defined as the radius below which an optical fiber or fiber-optic cable should not be bent because of mechanical or optical performance, for example, relating to optical attenuation. The minimum bend radius is of particular importance in the handling of fiber-optic cables, and it can vary with different cable designs and various types of optical fibers, such as conventional optical fibers and bend insensitive optical fibers. Generally, optical manufacturers specify a minimum radius to which the cable may safely be bent during installation, and for the long-term disposition of the cable. The minimum bend radius can be due to stresses associated with compression or tension acting on the cable, e.g., during installation procedures, for example, the cable may be bent around a sheave, wheel, drum or other arcuate surface generically shown at reference number 43 in FIG. 2B.

Figure 1:
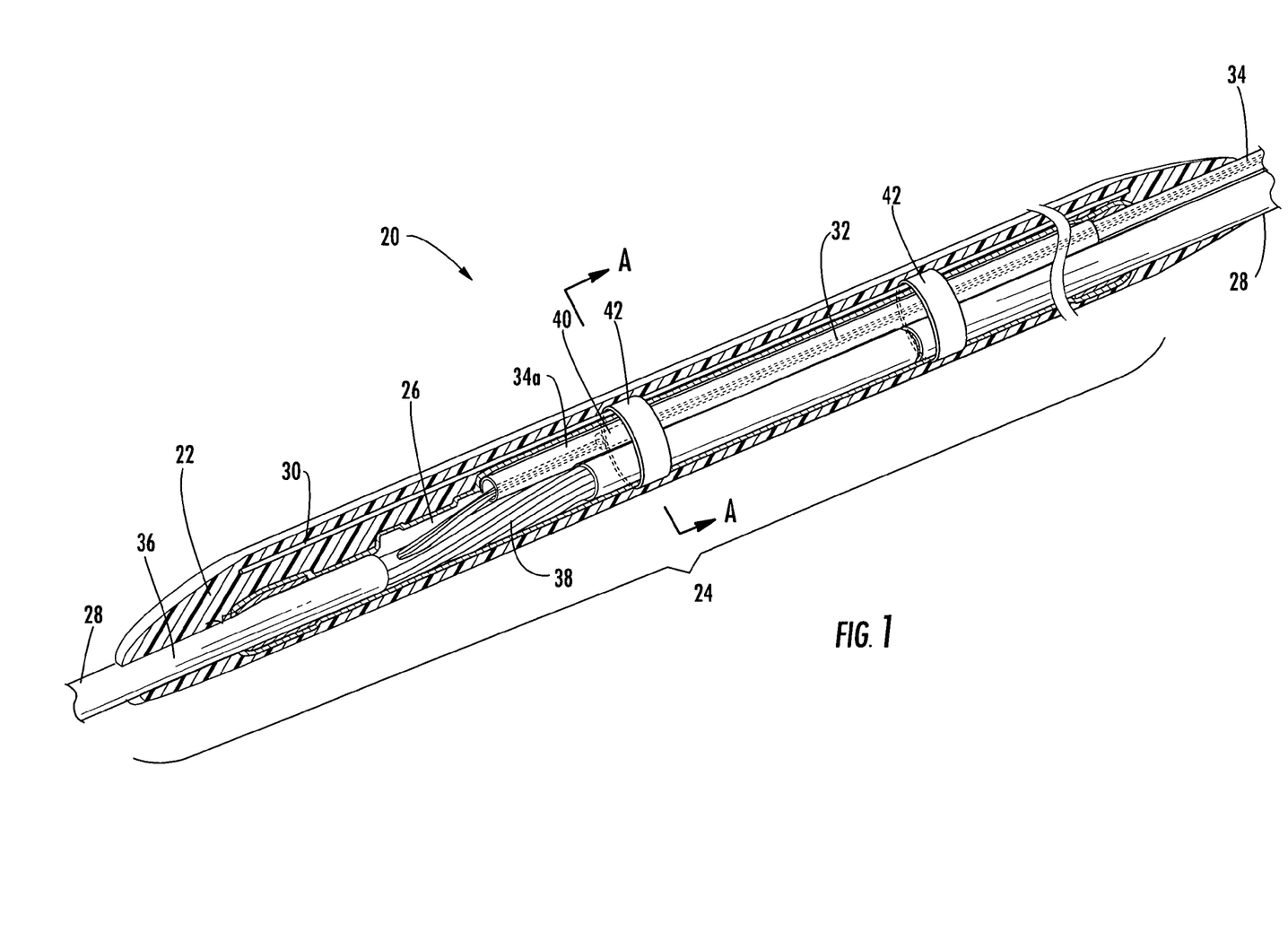
FIG. 1 is a perspective view of a flexible closure (shown in cross-section) operable for protecting a typical mid-span access location of a distribution cable, wherein one or more optical fibers are terminated from the distribution cable and transitioned into a tether at the mid-span access location.
Figure 2A:
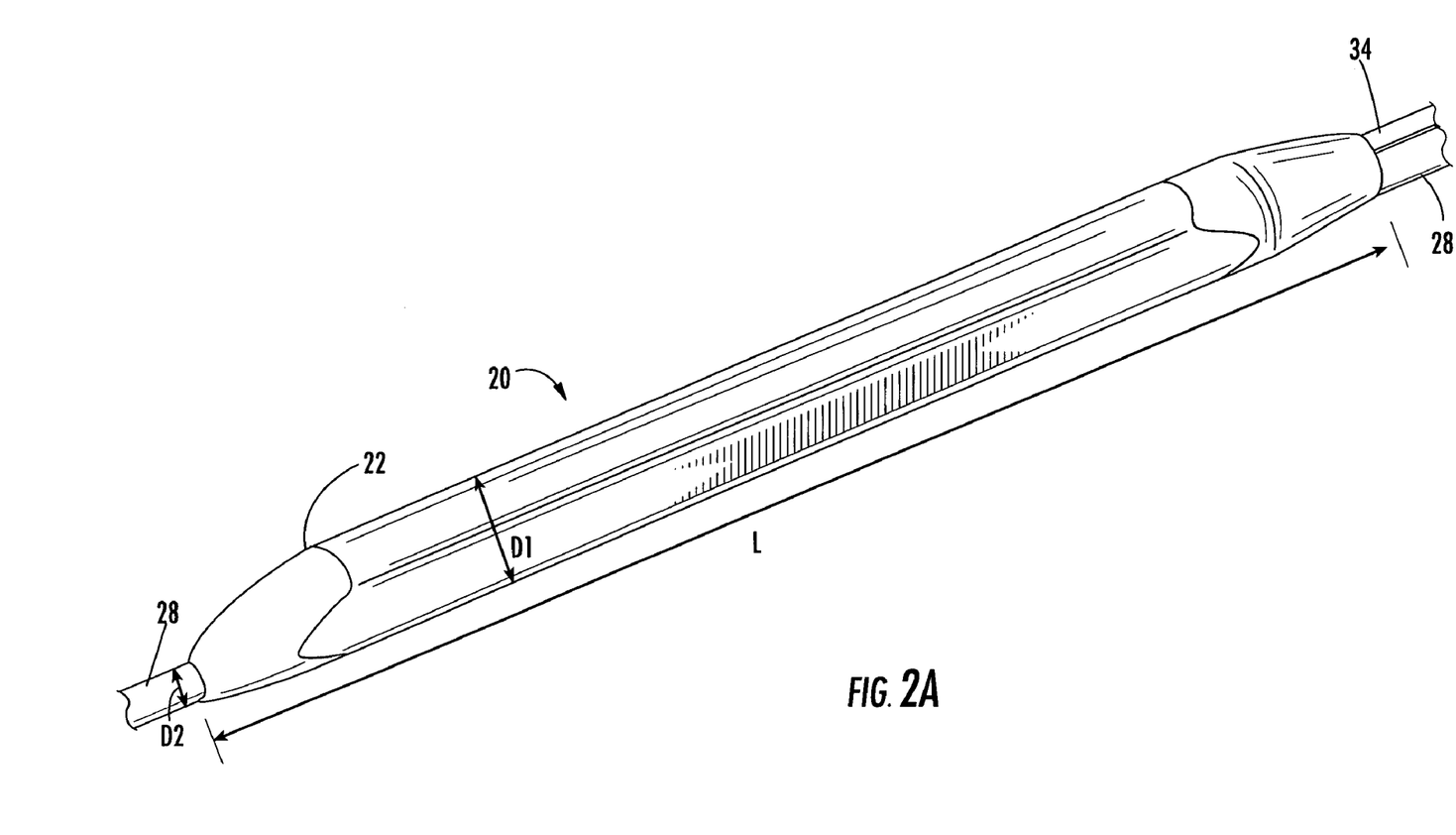
FIG. 2A is a perspective view of the flexible closure of FIG. 1 shown assembled and ready for cable installation using cable installation methods.

The flexible closure 22 can be bent with a force about equal to the force required to bend the cable 28 itself without the closure 22 attached. The flexible closure 22 preferably has an outer diameter sufficiently small enough to allow the pre-engineered cable assembly to be installed in buried and aerial networks through any conduit or duct, or over aerial installation sheave wheels and pulleys. Intrinsic properties of the molded or overmolded material itself contribute to the flexibility of the closure 22, and in some embodiments, the geometric shape of the closure 22 and the positioning of strength components 30 within the flexible closure 22 contribute to controlled stiffness and may provide a preferential bend to the flexible closure 22.

The mid-span access location 24 provides a means for optically connecting the one or more terminated optical fibers 26 of the distribution cable 28 with one or more optical fibers 32 of a tether 34. As used herein, the term "tether" is intended to include a fiber optic cable or a tubular body 34a distinct from the cable having one or more optical fibers disposed within the tubular body, which can be of any suitable cross sectional shape. The tube 34a may include a blocking device, heat shrink device, or plug, at either or both ends thereof for inhibiting the ingress of undesired material. As is well known and understood in the optical fiber connecting art, the one or more optical fibers 32 of the tether 34 and the one or more optical fibers 26 of the distribution cable 28 may be spliced or otherwise connected together in any manner, such as by fusion or mechanical splicing, either individually or in mass. The tether 34 may ultimately be interconnected with a fiber optic branch cable or a fiber optic drop cable containing one or more optical fibers connected to an outside plant optical connection terminal, such as a network interface deice (NID) at a subscriber premises. Thus, the distribution cable assembly 20 provides a tethered distribution point or termination point in a fiber optic network for interconnecting optical fibers of a distribution cable with optical fibers of a branch cable or drop cable.

The mid-span access location 24 is the point along the distribution cable 28 at which a single fiber or a subset of optical fibers 26 are preterminated and routed separate from the remaining intact optical fibers of the distribution cable 28. In one example of how to prepare a mid-span access location 24 in the factory, a section of the sheath 36 of the distribution cable 28 is removed to expose the underlying plurality of tubular bodies (e.g. buffer tubes 38). As shown, the buffer tubes 38 are helically wound in a known manner. The exposed length of the distribution cable 28 and the buffer tubes 38 may vary. However, in a preferred embodiment, the length ranges between about 3 and about 36 inches. The exposed length of the buffer tubes 38 allows for about 5 to about 30 inches of optical fiber to be withdrawn for subsequent splicing, thereby providing sufficient slack fiber length for more than one splice attempt.

For a given mid-span access location 24, the appropriate buffer tube(s) 38 may be accessed in multiple places using a standard No-Slack Optical Fiber Access Tool (NOFAT) available from Corning Cable Systems LLC of Hickory, N.C. The NOFAT tool is suitable for use in locations in which a limited amount of cable slack can be obtained and the buffer tubes 38 remain helically wrapped around a central member (not shown). The NOFAT tool provides a guide that allows a scalpel to open a buffer tube 38 without cutting completely through the buffer tube 38 or the optical fibers disposed within. The NOFAT tool is compatible with standard sizes of buffer tubes 38 utilized in Corning Cable Systems ALTOS® Cable. Although not shown, multiple buffer tube access ports are cut on the appropriate buffer tube 38. Starting at a downstream access port, a predetermined number of optical fibers are accessed and severed. In a buffer tube 38 comprising twelve optical fibers, four or eight optical fibers, for example, may be preterminated. The remaining optical fibers disposed within the buffer tube 38 remain intact and continue through the distribution cable 28, possibly being preterminated at another downstream mid-span access location. The severed optical fibers are then fished out of an upstream access port cut on the same buffer tube 38, thereby exposing the total optical fiber length of about 5 to about 30 inches. In alternative embodiments, multiple upstream access ports may be cut on a single buffer tube 38 in order to successfully fish out the desired length of optical fiber in stages. The minimum bend radius of the optical fibers is not violated during the process of fishing-out the fibers. After removing the optical fibers from the buffer tube 38, any water-blocking gel (if present within the buffer tube) is cleaned off of the entire length of the exposed optical fibers.

The optical fibers 26 of the distribution cable 28 are smoothly transitioned out of their respective buffer tube 38 and are then spliced, as described above, to the optical fibers 32 of the tether 34. The splice points may be held and protected using one or more splice protectors 40 or heat deformable material. Exposed accessed ports may be sealed with a suitable material such as RTV or epoxy. The splice points may also be held within a seal splice protector tube. In some embodiments, a water-blocking wrap and/or a protective layer may be added around the mid-span access location 24 prior to overmolding. The overmolding process typically involves preparing the sheath 36 of the distribution cable 28 in a manner known in the art, such as by cleaning and roughening, flame preparing or chemically preparing the surface. The assembly is placed into an overmolding tool (shown in FIG. 8) and the liquid material is introduced into the cavity defined by the molding tool.

The tether 34 may have any predetermined length, but in preferred embodiments has a length not exceeding about 100 feet, more preferably not exceeding about 25 feet, and even more preferably between about 12 and 15 feet. The tether 34 ensures that access to the preterminated optical fibers 26 may be placed in any desired location regardless of the placement of the mid-span access location 24 after deployment. Thus, the tether 34 permits the distribution cable assembly 20 to be pre-engineered and manufactured without absolute accuracy in the placement of the mid-span access locations 24. If desired, the tether 34 can be securely attached to the distribution cable 28 via strapping 42, lashing, clamps or other like fasteners at predetermined intervals along its length, both within the flexible closure 22 and outside of the closure 22 (not shown). The distribution cable 28 and the tether 34 are lashed together in the factory and wound onto a reel as a complete distribution cable assembly 20. The outside closure lashings may remain in place during deployment of the distribution cable assembly 20 and may be removed following deployment when the tether 34 is positioned at a desired location.

Although not shown, the tether 34 may terminate, for example, in one or more splice-ready optical fibers disposed within a protective body such that the optical fibers may be dressed and spliced in the field to respective optical fibers of a fiber optic branch cable or a fiber optic drop cable. The tether 34 may also terminate in connectorized optical fibers configured with a variety of connector types, such as but not limited to SC, LC, DC, FC, ST, SC/DC, MT-RJ, MTP, MPO and other like single or multi-fiber ferrules now known or hereafter developed. The protective body is preferably designed to withstand expected crush forces and is secured to the tether 34 by a heat deformable material or overmolded material. The heat deformable or overmolded material may also be operable for providing a smooth transition between the different outer diameters of the sheath of the tether 34 and the protective body, thus aiding deployment through conduit or aerial lashing equipment.

Referring specifically to FIG. 2A, the flexible closure of FIG. 1 is shown assembled and ready for cable installation using conventional cable installation methods. It should be understood that the intrinsic properties and physical characteristics of the flexible closure 22 may also apply to other overmolded bodies for protecting and sealing cable access points, optical splice points and optical interconnection points within a fiber optic communications network. It is preferred that the flexible closure 22 is capable of bending to about the minimum bend radius of the fiber optic cable upon which it is installed. The flexible closure 22 has a bending force ratio of about 1.0 to about 5.0, more preferably from about 1.3 to about 3.4, wherein the bending force ratio is defined as the ratio of two forces, first, the force required to bend the flexible closure 22 90 degrees about the minimum bend radius desired for the fiber optic cable, and divided by a second force being the force required to bend the same fiber optic cable 90 degrees about the minimum bend radius of that same cable. In the most preferred embodiments, the flexible closure 22 has a bending force ratio of about 1.0, implying that the force required to bend the flexible closure 22 is about equivalent to the force required to bend that same fiber optic cable without the closure 22. Some of the main factors that determine this ratio are the stiffness and diameter of the cable and the flexible closure 22. As the stiffness and diameter of the overmold material increases the ratio increases. As the stiffness and diameter of the cable increases the ratio decreases.

Figure 2B:
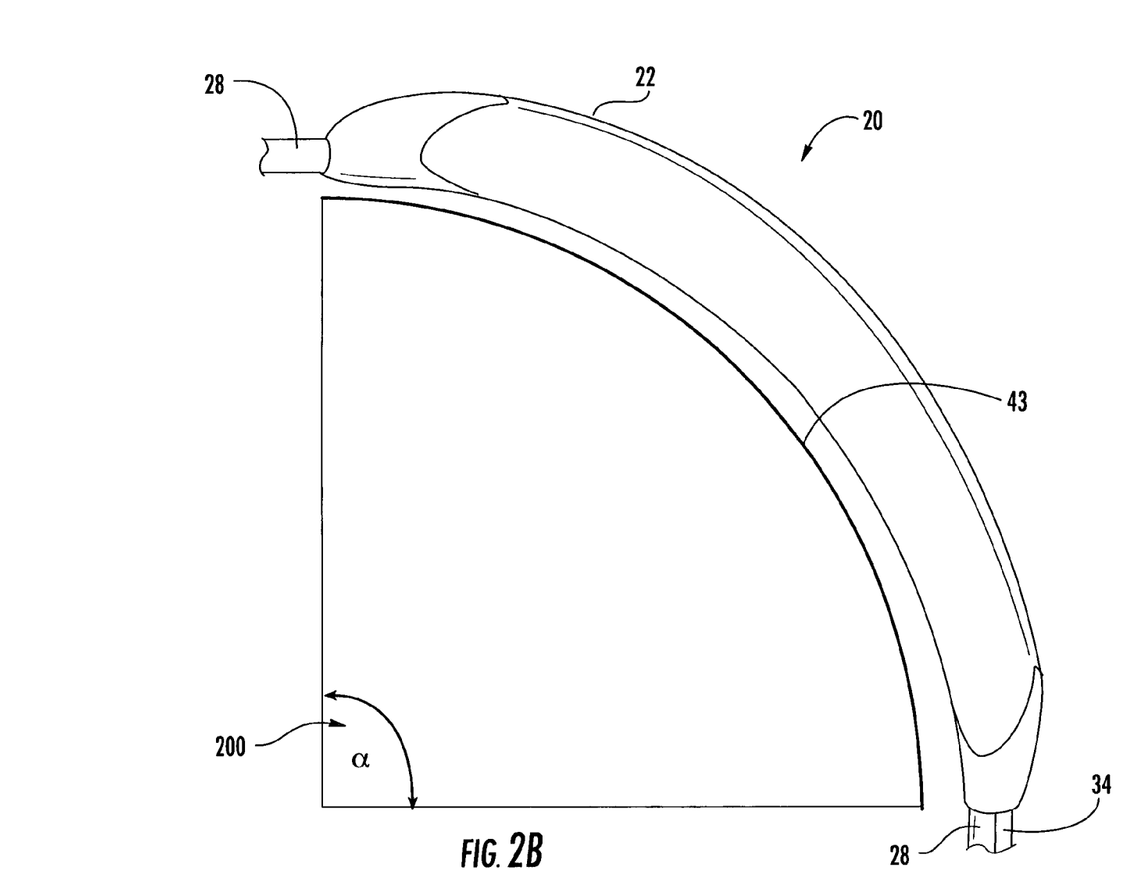
FIG. 2B is a perspective view of the flexible closure of FIG. 1 shown bent around an arc that generically represents a reel, sheave wheel, pulley, inner wall of a conduit, or other installation tool or obstacle.
Figure 2C:
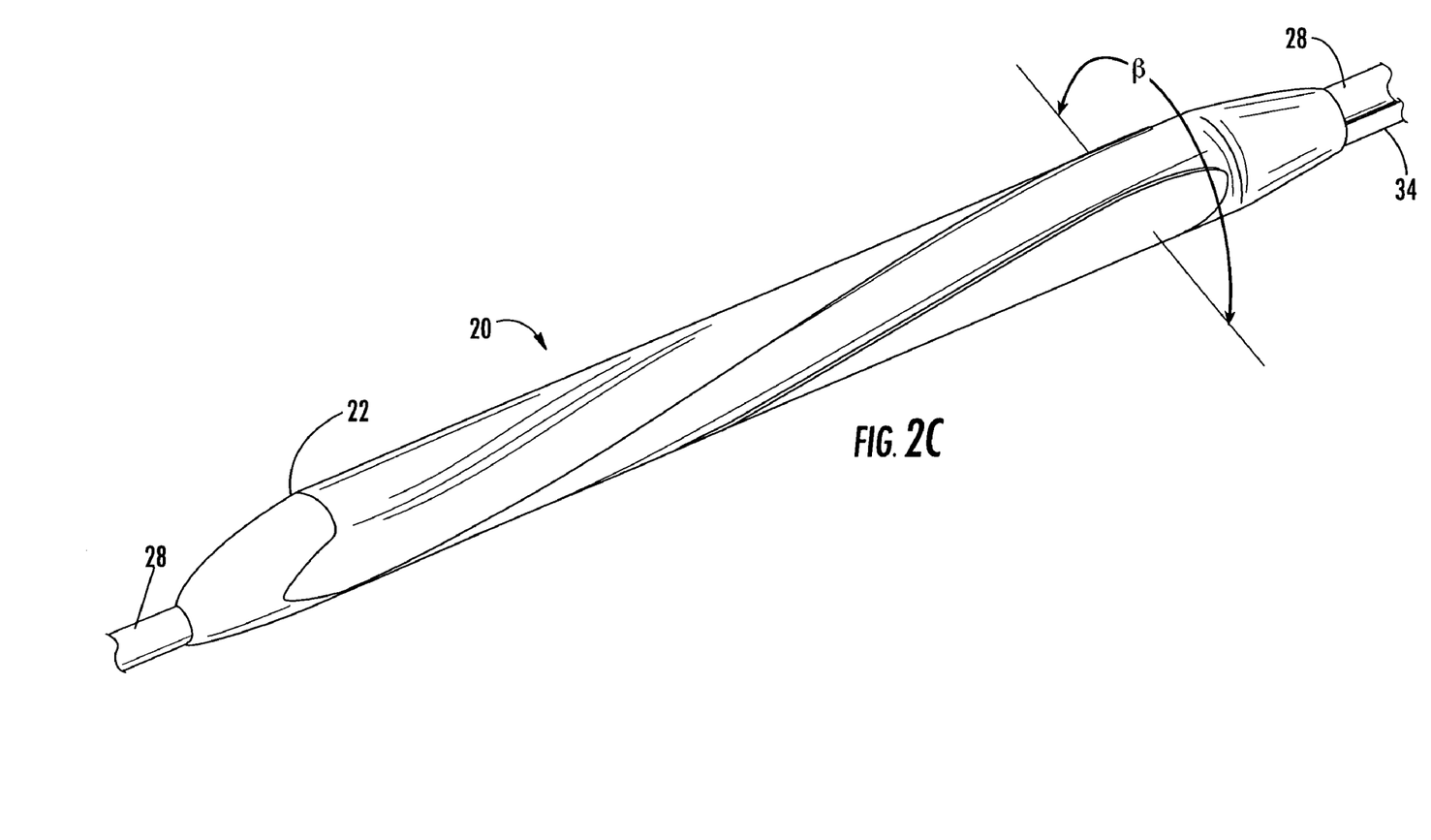
FIG. 2C is a perspective view of the flexible closure of FIG. 1 shown twisted in order to facilitate installation.

Referring specifically to FIG. 2B, the flexible closure 22 is capable of bending during reeling, installation and deployment without incurring physical damage to the closure and optical contents within. In preferred embodiments, the flexible closure 22 has a bending range from about 0 degrees to about 360 degrees and is shown bent around an arc 43 that is used to generically represent a sheave wheel, pulley, conduit wall or other installation equipment or obstacle. The bend angle is shown as angle α at reference number 200. In typical installations, a bending range from about 0 degrees to about 180 degrees is usually sufficient to allow proper installation. Referring specifically to FIG. 2C, the flexible closure 22 can also be twisted without incurring damage to the closure structure or contents within and without compromising sealing. The flexible closure 22 may also be bent into other complex shapes without incurring physical damage, such as S-curves and loops. The flexible closure 22 can also be bent and twisted at the same time.

Referring again to FIG. 2A, the closure 22 preferably has an outer diameter D1 from about 0.5 to 5 inches, where functional outer diameters go up to about 4 inches for aerial applications where less than 3 inches is preferred, and up to about 4 inches for buried applications where less than 2 inches is preferred. The most preferred flexible closure 22 has an outer diameter less than 1 inch to permit both buried and aerial network installations through any conventional conduit or hanging blocks. The flexible closure 22 preferably has a diametral ratio (the ratio of the overmold outer diameter divided by the cable outer diameter D2) of about 2.0, while diametral ratios of about 3.0 may also be practiced. Preferred closure embodiments have an aspect ratio (being the ratio of the length L of the closure 22 divided by the outer diameter D1) ranging from about 10 to about 30, more preferred from about 20 to about 30.

Intrinsic properties of the overmold material itself also contribute to the stiffness of the flexible closure 22. Two material properties used to characterize the bending of the flexible closure 22 are the modulus of elasticity (Young's modulus) and Poisson's Ratio. Young's modulus is the slope of the initial, linear-elastic part of a stress-strain curve in tension or compression, and Poisson's ratio is the negative of the ratio of a lateral strain to uniaxial strain, in axial loading. The overmold material is preferably selected from suitable materials that include, but are not limited to, polyurethanes, silicones, thermoplastics and like materials that provide a modulus of elasticity of up to about 3.0 GPa, with a preferred range from about 0.001 to about 0.1 GPa, and an even more preferred modulus of elasticity of about 0.044 GPa. The flexible closure 22 preferably has a Poisson's ratio from about 0 to about 0.5, more preferably from about 0.2 to about 0.5, even more preferably from about 0.30 to about 0.5.

Referring to FIGS. 1-4, the flexible closure 22 may include a preferential bend to reduce the path length differences between the optical fibers 26 terminated from the distribution cable 28 and the optical fibers remaining in the distribution cable 28, thereby preventing breakage of the terminated optical fibers due to axial tension stresses induced by bending. The terminated optical fibers 26 are smoothly transitioned from their respective buffer tube(s) into the tether 34. By routing the terminated optical fibers 26 separately from the remaining optical fibers, path length differences between the terminated optical fibers 26 and the remaining optical fibers arise when the mid-span access location is bent along an uncommon axis. These path length differences induced by bending occur unless the terminated optical fibers 26 are routed along a neutral bending axis as they transition from the distribution cable 28 into the tether 34. In various embodiments, one or more strength members may be added to each mid-span access location prior to overmolding in order to provide the preferential bend in the access location 24. In other embodiments, the mid-span access location 24 may be overmolded with a geometrical configuration such that the mid-span access location 24 bends along a neutral axis. In still further embodiments, both one or more strength members are added to the mid-span access location 24 prior to overmolding, and the mid-span access location 24 is overmolded with a geometrical configuration that promotes bending along the neutral axis.

Figure 4:
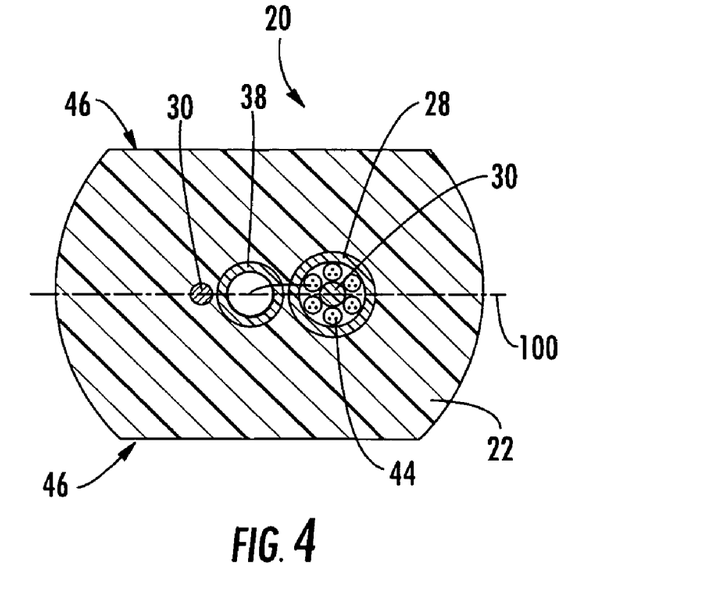
FIG. 4 is a cross-sectional view of an exemplary embodiment of a mid-span access location including a strength member positioned within the flexible closure, and further illustrating the flexible closure having a specific geometric configuration for providing a preferential bend.

More specifically, the preferential bend characteristics of the flexible closure can be created by including one or more strength members 30 being generally aligned with the distribution cable 28. The one or more strength members 30 are preferably rod shaped and extend lengthwise along the length of the mid-span access location 24. However, it will be appreciated by those skilled in the art that a strength member 30 may have a variety of different shapes sufficient to create a mid-span access location 24 with a preferential bend. The one or more strength members 30 are positioned within the mid-span access location 24 prior to overmolding. Preferably, a strength member 30 is formed from glass reinforced plastic (GRP). However, it will be understood by those skilled in the art that any plastic, fiber-glass, composite, yarn or metal material having a bend radius compatible with the bend radius of the distribution cable to create a preferential bend of the mid-span access location 24 may be used.

Figure 3:
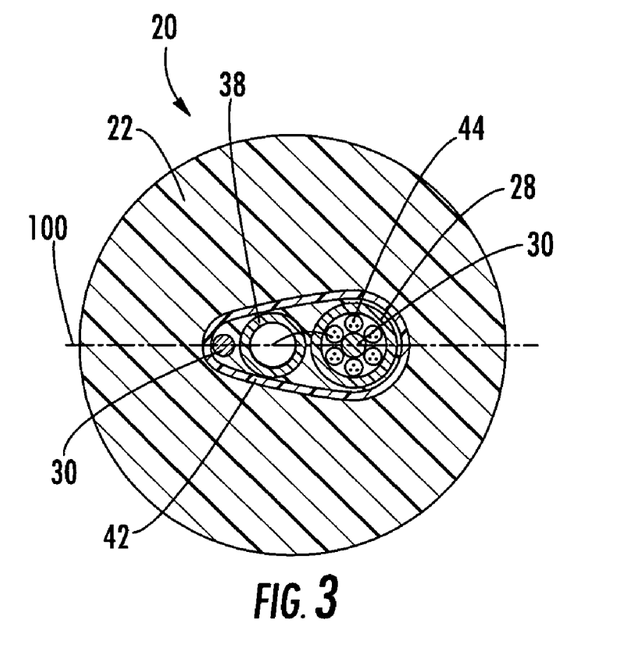
FIG. 3 is a cross-sectional view of the mid-span access location of the distribution cable assembly of FIG. 1 taken along line A-A.

Referring specifically to FIG. 3, a cross-sectional view of the distribution cable assembly 20 taken through mid-span access location 24 at line A-A is shown. Bending occurs along the neutral axis indicated by reference numeral 100. As used herein, the term "neutral axis" is intended to describe the axis along which the axial stresses of the terminated optical fibers 26 and the remaining optical fibers 44 of the distribution cable 28 is substantially equal to zero, thus reducing any path length differences between the terminated optical fibers 26 and the remaining optical fibers 44. By bending the mid-span access location 24 along the neutral axis 100, the strength members 30 are stressed equally. If a force is applied to the mid-span access location 24, the axial alignment and tensile strength of the strength members 30 minimizes torsion and causes the mid-span access location 24 to bend along the neutral axis 100. In addition, the use of the strength members 30 preserves the integrity of the flexible closure 22 by creating a preferential bend along an axis that reduces the amount of stress in the thinnest or weakest areas of the overmolding material in the mid-span access location 24.

Referring specifically to FIG. 4, a cross-sectional view of another exemplary embodiment of a mid-span access location is shown. As in the previous embodiment, the mid-span access location comprises an additional strength member 30. The flexibility of the mid-span access location depends primarily on the overmolding material chosen and the geometrical configuration of the flexible closure 22. As shown, the geometrical configuration is formed by making D-cuts, indicated by reference numeral 46, or by overmolding the closure 22 within a tool having the desired cross-sectional shape. By the inclusion of the strength member 30 and the geometrical configuration of the flexible closure 22, the mid-span access location has a preferential bend along the neutral axis 100. In an alternative embodiment, the additional strength member 30 may be removed and the geometrical configuration of the flexible closure 22 will still provide a preferential bend along the neutral axis 100, although to a lesser extent.

Figure 5:
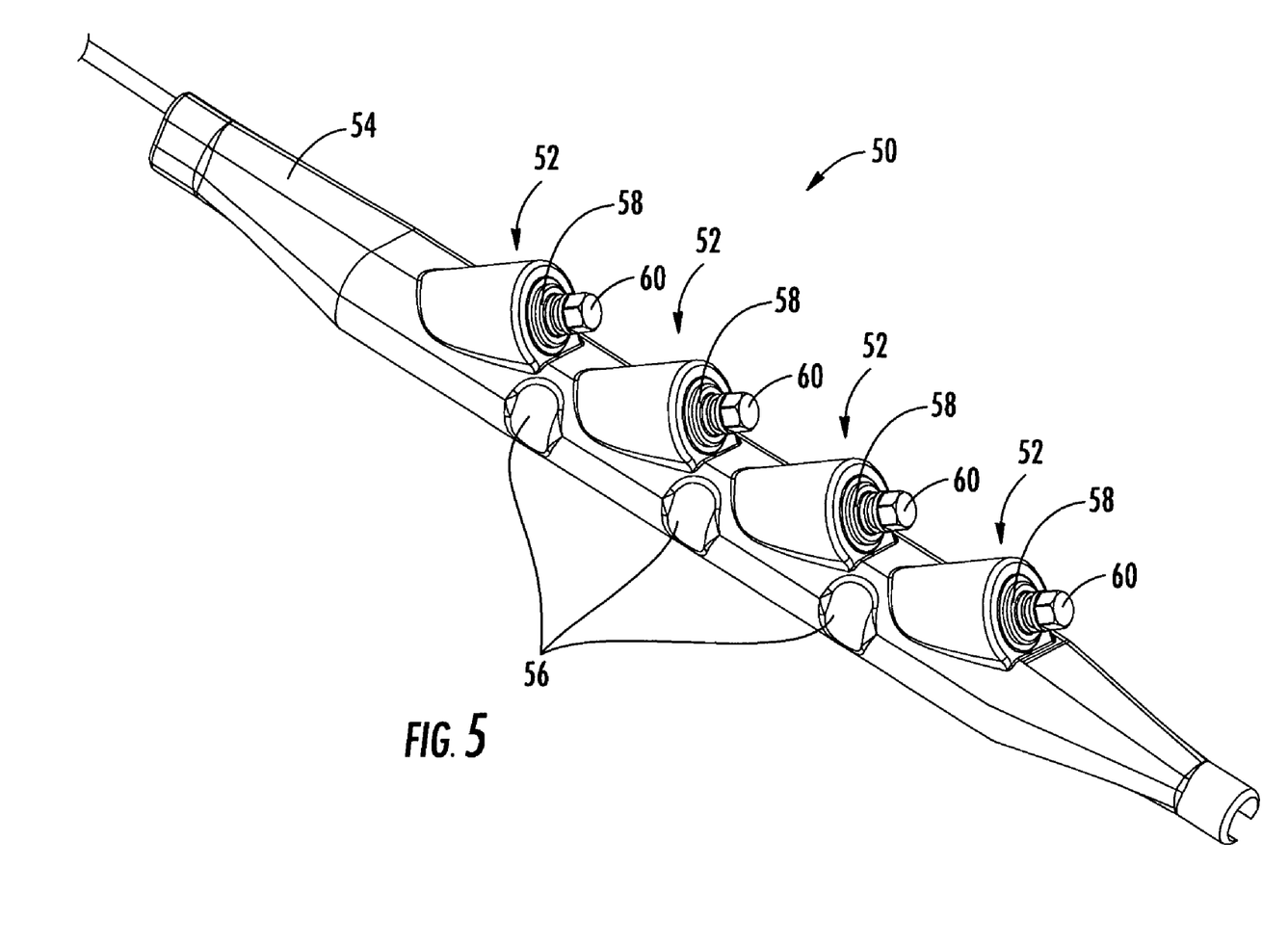
FIG. 5 is a perspective view of an adjustable, flexible overmolded optical connection terminal including a plurality of connector ports arranged in a linear fashion, wherein the connector ports are operable for interconnecting tether optical fibers with connectorized drop cables.

Referring to FIG. 5, an optical connection terminal 50 positioned about the end of the tether 34 may be used to mitigate span length measurement issues that result from the improper location of the mid-span access location 34 due to differences between a pre-engineered span length distance and the actual span length distance following installation of a distribution cable assembly. The optical connection terminal 50 provides a drop cable interconnection point at a desired location away from a mid-span access 34, such as a telephone pole, hand-hole, pedestal, network connection terminal, etc. The optical connection terminal 50 includes one or more connector ports 52 that provide external access to the one or more, preferably pre-connectorized, optical fibers of the tether 34 that are optically connected to the terminated optical fibers 26 of the distribution cable 28. The connector ports 52 may be used to readily interconnect optical fibers of one or more connectorized fiber optic drop cables (not shown) with the terminated optical fibers 26 of a fiber optic distribution cable 28 at a desired location in a fiber optic communications network. In a network embodiment, a plurality of drop cables extending from a downstream location, such as a subscriber premises or a pedestal may be optically connected to the connector ports 52, thus allowing a field technician to readily connect, disconnect or reconfigure the drop cables at a convenient location and without disturbing the other connected drop cables.

The optical connection terminal 50 includes a housing 54 preferably made by the overmolding process described above. The housing 54 surrounds but is not fixed to the distribution cable 28 such that the housing 54 may be slid along the length of the distribution cable 28 or removed from the distribution cable 28 as desired. The connector ports 52, including their respective optical connectors, receptacles and optical fibers, the distribution cable 28 and the prepared end of the tether 34 are all laid within an overmolding tool. In alternative embodiments, a protective layer, such as, but not limited to, a foil made of tin or aluminum, may be used to protect the underlying components of the optical connection terminal 50 prior to overmolding. Other materials may be used to protect the components prior to overmolding, provided that the material is capable of being shaped or formed to the underlying components and their structure. A layer of foil or other material is placed around the distribution cable in order to reduce friction and prevent adhesion between the overmolded housing 54 and the distribution cable 28 so that the terminal 50 may be slid along the length of the distribution cable 28 after installation.

Once the components have been appropriately positioned within the overmolding tool, a second portion of the tool is positioned with the first portion to form a cavity for receiving the overmolding material. The pre-selected overmolding materials are injected or poured into the cavity defined by the overmolding tool. The overmolded housing 52 provides a protective shell, maintains sealing integrity and is capable of withstanding crush forces up to at least about 300 lbs. The housing 54 has a length and width sufficient to accommodate the desired number of connector ports 52 and is sufficiently flexible to permit the assembly to be deployed through relatively small diameter conduit or through aerial lashing equipment. The degree of flexibility is dependent upon the material chosen, the geometry of the underlying components and the geometry of the housing 54 itself. For example, the overmolded housing 54 may have a preferential bend in the same direction as the preferential bend of the underlying distribution cable 28. Voids 56 may be molded into the housing 54 in the direction of the preferential bend in order to influence the housing 54 to bend in a certain direction. The voids 56 reduce the amount of housing material that must be compressed during bending, thus facilitating bending in that direction. In an alternative embodiment, a strength member may be added to the optical connection terminal 50 prior to overmolding in order to force the distribution cable 28 and the terminal 50 to bend along a common axis. In all embodiments, the overmolded housing 54 may have any desired shape, however, the preferred shape is both low profile and has rounded or tapered ends so as to avoid snagging during deployment of the assembly through conduits or aerial lashing equipment. The shape of the housing 54 surrounding the connector ports 52 is also rounded in order to avoid snagging.

The example shown comprises four connector ports 52 arranged in a linear fashion for installation flexibility. Each connector port 52 comprises a rugged and strain-relieving receptacle 58, adapter or alignment sleeve for presenting a connectorized optical fiber of the tether 34 and receiving a pre-connectorized plug of a fiber optic drop cable. In other words, each connector port 52 is a fiber optic receptacle operable for receiving one or more preterminated optical fibers of the tether 34 on the inside of the connector port 52, and a pre-connectorized fiber optic drop cable on the outside of the connector port 52. As used herein, the term "connector port" is intended to broadly include an opening through which the optical fibers (splice-ready or connectorized) of the tether 34 are optically connected to the optical fibers of a drop cable. In various embodiments, the connector port 52 may include a factory-installed connector alignment sleeve (not shown) for aligning and maintaining mating connectors in opposing physical contact. Preferably, the connector port 52 further provides an environmental seal at the optical connection between the optical fibers of the tether 34 and the drop cable. The connector ports 52 may also serve to transfer any tension load on the drop cables to the housing 54. Each connector port 28 is covered with a protective dust cap 60 during shipping and deployment and until the connector port 52 is needed. The protective dust cap 60 prevents water and other contaminants from penetrating the connector port 52 and damaging the optical fiber(s) disposed within.

Figure 6:
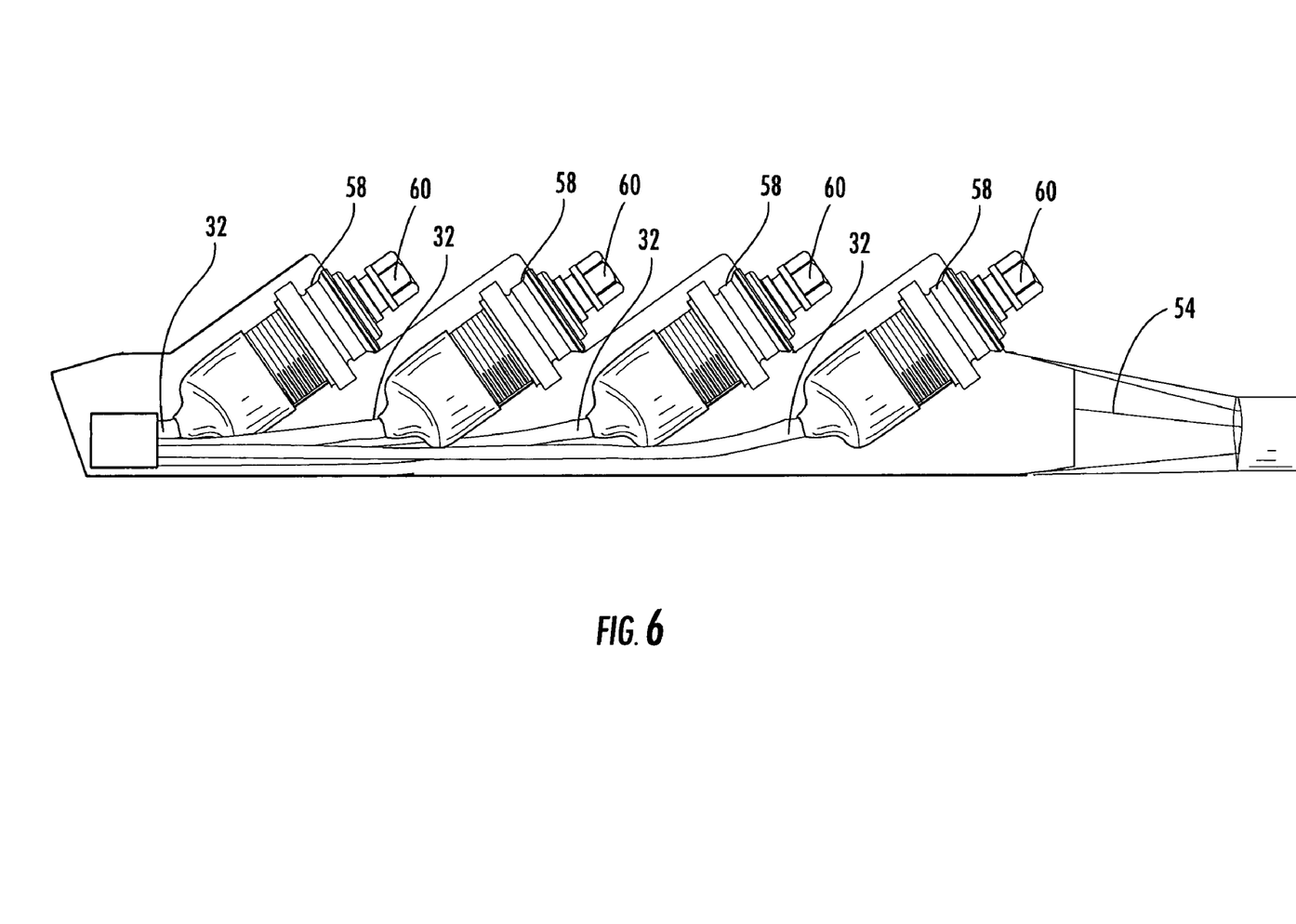
FIG. 6 is a perspective view of the overmolded optical connection terminal shown in FIG. 5, where the overmolded portion is shown in cross-section in order to illustrate the fiber management within.

Referring to FIG. 6, a side profile view of the downstream end of the optical connection terminal 50 is shown with a portion of the overmolded housing 54 removed in order to illustrate a typical connector port 52 secured within the overmolded housing 54 and covered with a protective dust cap 60. The connector ports 52 are preferably oriented at an angle within the housing 54 relative to the distribution cable 28 in order to reduce the overall diameter of the terminal 50. Optical fibers 32 of the tether 34 (shown within a protective outer sheath or jacket) are routed to their respective connector ports 52. As shown, a receptacle 58 is secured within the overmolded housing 54 or may be threaded into an opening defined by the overmolded housing 54. By threading the receptacle 58 into the housing 54, the receptacle 58 may be removed from the housing 54 in order to access the backside of the receptacle 58 for cleaning the optical fiber(s) 32. Excess fiber length may be managed within the housing 54. A furcation may also be retained within the housing at the upstream end of the terminal 50.

Figure 7:
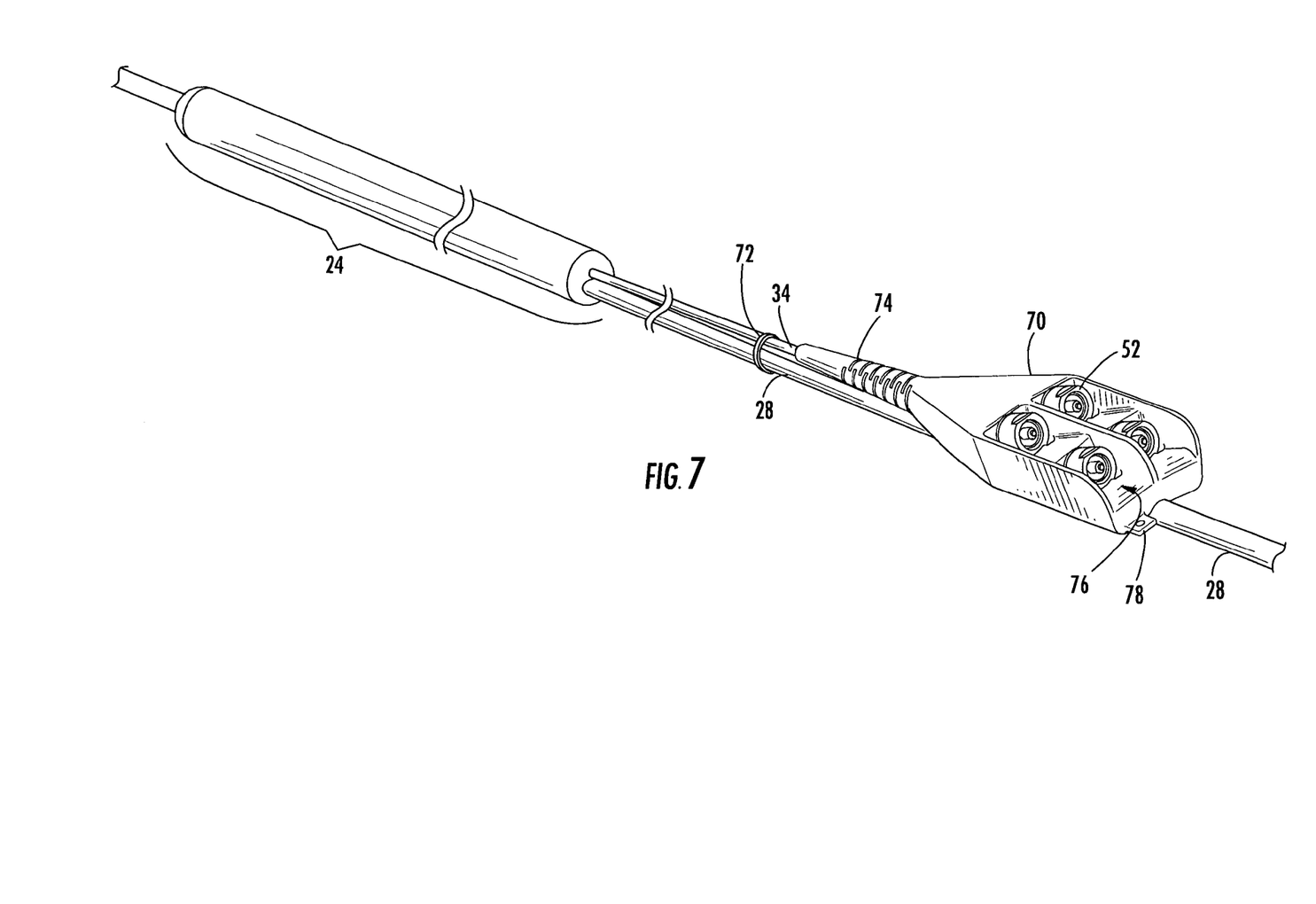
FIG. 7 is a perspective view of another embodiment of an overmolded optical connection terminal including a plurality of connector ports.

Referring to FIG. 7, a perspective view of a typical mid-span access location 24 having a tether 34 attached to the distribution cable 28 that terminates in an overmolded multi-port optical connection terminal 70 is shown. In this embodiment, the overmolded optical connection terminal 70 provides access to one or more optical fibers optically connected to the terminated optical fibers 26 of the distribution cable 28. The overmolded optical connection terminal 70 may be used to readily interconnect optical fibers of one or more connectorized fiber optic branch or drop cables with the terminated optical fibers 26 of the fiber optic distribution cable 28 at a desired location in a fiber optic communications network. The tethered overmolded optical connection terminal 70 is preferably lashed to the distribution cable 28 using fasteners 72 at intervals along the length of the tether 34. Although four connector ports 52 are shown, any number of connector ports 52 may be accommodated. The terminal 70 defines a neck portion 74 that allows for additional flexibility during winding, shipping and deployment, and a groove may be formed on the underside of the overmolded structure for receiving the distribution cable 28 to provide a low profile configuration for deployment through conduit or through aerial lashing equipment. The overmolded structure also defines recesses 76 that protect the connector ports 52 from damage caused by impact. A molded tab 78 may be used both as a pulling grip and as a feature for securing the overmolded optical connection terminal 70 in a desired location following deployment.

Figure 8:
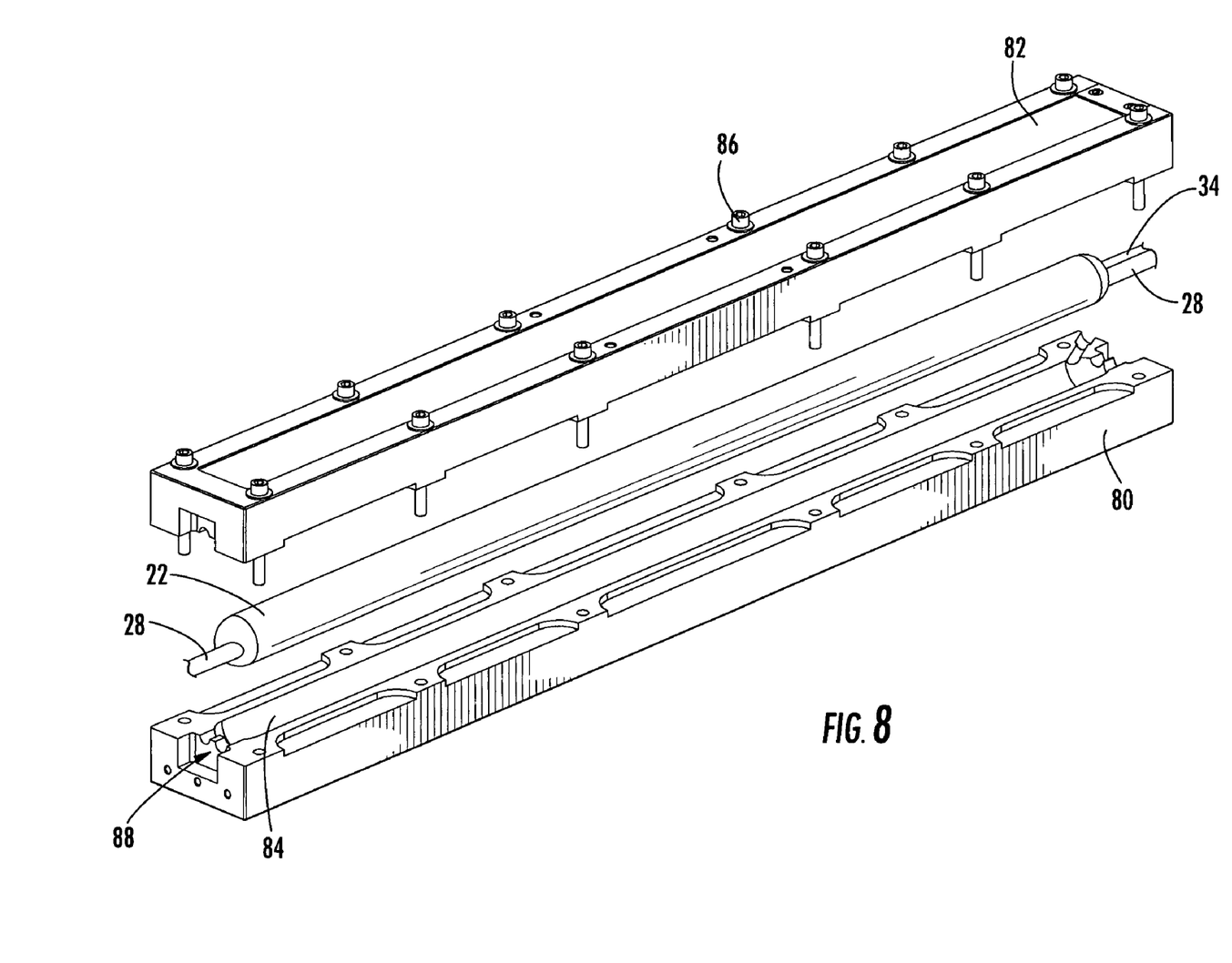
FIG. 8 is a perspective view of an overmolding tool.

Referring to FIG. 8, one example of a tool for overmolding a mid-span access location 24, including the portion of the tether 34 attached to the distribution cable 28, is shown. The overmolding tool comprises two halves 80 and 82 that clamp together around the mid-span access location 24 to define a cavity 84 that is injected with a flexible encapsulating, overmolding material. The two halves 80, 82 may be secured together using suitable fasteners 86, such as screws or bolts. The overmolding tool further defines features 88 for receiving the distribution cable 28 and the tether 34 and holding the distribution cable assembly in position during material injection and curing. It is important that the distribution cable assembly 20 be held in the proper position during material injection and curing so that the resulting thickness of the overmolding material all the way around will be sufficient to avoid fracture during flexing. The overmolding tool further comprises at least one inlet and one outlet for injecting the overmolding material. The overmolding material surrounds the mid-span access location and components and fills in all air spaces between the components and the walls of the interior cavity.

In alternative embodiments, other optical connection terminals may be formed from the overmolding process including any number of optical connectors arranged in any manner. In preferred embodiments, the protection and sealing performance of the overmolded optical connection terminal equals or exceeds the performance of conventional rigid connection terminals. The material properties of the overmold material allow the connection terminal to be sufficiently flexible and small so as to permit the factory-manufactured cable assembly to be installed using conventional cable installation methods.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. For example, other flexible closures and structures may be used in the production of pre-engineered cable assemblies in order to replace conventional stiff assemblies incapable of being installed within a factory and then deployed using conventional cable installation methods without incurring any damage to the closure or fibers within. The material and physical properties of the overmold materials and methods of overmolding may also be modified so long as the assembly remains flexible and the fibers and splices within do not significantly attenuate when exposed to conventional installation stresses. The flexibility of the flexible closure of the present invention is preferably all or substantially all in the elastic regime of the materials being stressed during a resilient, reversible flexure, however, it is possible to practice the present invention in the context of stressing one or more components beyond its expected elastic limit.

What is claimed is:

1. A flexible closure being attached to at least one optical fiber cable deployable using cable installation methods:
the flexible closure comprising at least one molded portion, the molded portion being formed of a resilient and flexible material thereby forming a durable and flexible body associated with and protecting optical components associated with the flexible closure, the optical components comprising at least one optical fiber in the fiber optic cable and at least one other optical component forming an optical connection with the at least one optical fiber; and
the flexible closure being resiliently bendable and twistable in variable directions, and being flexible in response to stresses acting on the flexible closure due to cable installation equipment and maintaining mechanical integrity of the flexible closure protecting the performance on the optical components therein
wherein the flexible closure has a bending force ratio from about 1.0 to about 5.0.

2. The flexible closure according to claim 1, wherein the flexible closure is capable of bending to about a predetermined minimum bend radius of the fiber optic cable upon which it is installed.

3. The flexible closure according to claim 1, wherein the flexible closure has an outer diameter less than about 4 inches.

4. The flexible closure according to claim 1, wherein the flexible closure has an outer diameter less than about 3 inches.

5. The flexible closure according to claim 1, wherein the ratio of the flexible closure outer diameter to the outer diameter of the optical fiber cable is about 1 to about 4.

6. The flexible closure according to claim 1, wherein the flexible closure has an aspect ratio of about 10 to about 30.

7. The flexible closure according to claim 1, wherein the material used to form the molded portion of the flexible closure has a modulus of elasticity of about 0.001 GPa to about 3.0 GPa.

8. The flexible closure according to claim 1, wherein the material used to form the molded portion of the flexible closure has a Poisson's ratio from about 0.30 to about 0.5.

9. The flexible closure according to claim 1, wherein the flexible closure protects and seals an underlying mid-span access location in which one or more terminated optical fibers are routed separate from the fiber optic cable and are spliced or otherwise optically connected to one or more optical fibers of a tether.

10. A flexible closure assembly for use in a fiber optic distribution cable assembly, comprising:
a distribution cable comprising a plurality of optical fibers and having at least one predetermined mid-span access location positioned along the length of the distribution cable;
at least one optical fiber of the distribution cable being accessed and terminated from the distribution cable at the mid-span access location;
a tether comprising a first end attached to the distribution cable at the mid-span access location and at least one optical connection being an optical fiber optically connected to the at least one terminated optical fiber of the distribution cable; and
a flexible closure positioned about the mid-span access location, said flexible closure being resiliently bendable and flexible in response to stresses acting on the flexible closure due to cable installation equipment, without incurring substantial breakage or cracking of the molded portion of the optical connection, and without significant degradation of optical performance of the optical connection
wherein the flexible closure is capable of bending to about the minimum bend radius of the distribution cable upon which it is Installed, and the flexible closure has a bending force ratio of about 1.0 to about 5.0. and has an aspect ratio of about 10 to about 30.

11. The flexible closure assembly according to claim 10, wherein the flexible closure comprises a molded portion formed by a molding process within a factory and is then cured and deployed using cable installation methods.

12. The flexible closure assembly according to claim 10, wherein the flexible closure has an outer diameter less than about 3 inches.

13. The flexible closure assembly according to claim 10, wherein the ratio of the closure outer diameter to the distribution cable outer diameter is about 1 to about 4.

14. The flexible closure assembly according to claim 10, wherein the flexible closure has a modulus of elasticity of about 0.001 GPa to about 0.1 GPa.

15. The flexible closure assembly according to claim 10, wherein the flexible closure has a Poisson's ratio of about 0.30 to about 0.5.

16. The flexible closure assembly according to claim 10, wherein the assembly is pre-manufactured and then deployed using drive-off cable installation methods wherein the cable is played off a moving vehicle as it moves along the cable installation line.

17. The flexible closure assembly according to claim 10, wherein the tether has a length up to about 100 feet for mitigating span length measurement errors and locating an optical connection terminal optically attached to the tether at a desired location within an optical network.

18. The flexible closure assembly according to claim 10, wherein the tether further comprises a second end opposite the first end of the tether for presenting the at least one optical fiber of the tether for interconnection with an optical connection terminal or one or more fiber optic drop cables.

19. The flexible closure assembly according to claim 10, wherein the molded portion mid-span access location is provided with a preferential bend.

20. The flexible closure assembly according to claim 10, further comprising one or more strength members for providing a preferential bend in the mid-span access location.

* * * * *